US010148036B2

(12) United States Patent
Susilo et al.

(10) Patent No.: US 10,148,036 B2
(45) Date of Patent: Dec. 4, 2018

(54) MULTI-PLATFORM MODULAR DEVICE

(71) Applicant: Vanderbilt University, Nashville, TN (US)

(72) Inventors: Ekawahyu Susilo, Nashville, TN (US); Nicolo Garbin, Nashville, TN (US); Pietro Valdastri, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 15/632,112

(22) Filed: Jun. 23, 2017

(65) Prior Publication Data
US 2017/0373434 A1 Dec. 28, 2017

Related U.S. Application Data

(60) Provisional application No. 62/353,673, filed on Jun. 23, 2016.

(51) Int. Cl.
*H01R 13/62* (2006.01)
*H01R 13/621* (2006.01)
*G09B 19/00* (2006.01)

(52) U.S. Cl.
CPC ..... *H01R 13/6205* (2013.01); *G09B 19/0069* (2013.01); *H01R 13/621* (2013.01)

(58) Field of Classification Search
CPC .. H01R 13/6205; H01R 11/30; H01R 12/714; H01R 23/722; G09B 19/0069
USPC ..................................................... 439/38–40
See application file for complete search history.

(56) References Cited

U.S. PATENT DOCUMENTS

2012/0218211 A1  8/2012  McRae et al.
2013/0050958 A1  2/2013  Bdeir

OTHER PUBLICATIONS

Atmosphere Corp., "Anaren Atmosphere Developer," <https://atmosphere.anaren.com/> webpage available as early as Mar. 16, 2015, 4 pages.
Bdeir et al., "Electronics as material: littleBits," In Proceedings of the fifth international conference on Tangible, embedded, and embodied interaction (TEI '11). ACM, New York, NY, USA, 2010; 341-344. DOI: 10.1145/1935701.1935781.
Github, "Espruino," <https://github.com/espruino/Espruino> webpage available as early as Mar. 4, 2015, 5 pages.
Google Developers.com, "Blockly," <https://developers.google.com/blockly> webpage available as early as Dec. 26, 2014, 3 pages.
Seattlepi.com Staff, "Fisher-Price's Code-a-Pillar teaches preschoolers basic coding skills," <http://blog. seattlepi.com/techchron/2016/01/13/fisher-prices-code-a-pillar-teaches-preschoolers-basic-coding-skills/> published Jan. 13, 2016, 3 pages.
Susilo et al., "eSMAC: an Affordable Modular Robotic Kit for Integrated STEM Education,"IEEE Robotics & Automation Magazine, 2016; 23(2):47-55. DOI: 10.1109/MRA.2016.2546703.

*Primary Examiner* — Ross Gushi
(74) *Attorney, Agent, or Firm* — Michael Best & Friedrich LLP

(57) ABSTRACT

A multi-platform modular device including a plurality of platforms or modules. Each module implements a different function and can be connected to another module via a plurality of magnetic contacts. The magnetic contacts can be used for synchronization, communication, and power delivery between the modules.

15 Claims, 10 Drawing Sheets

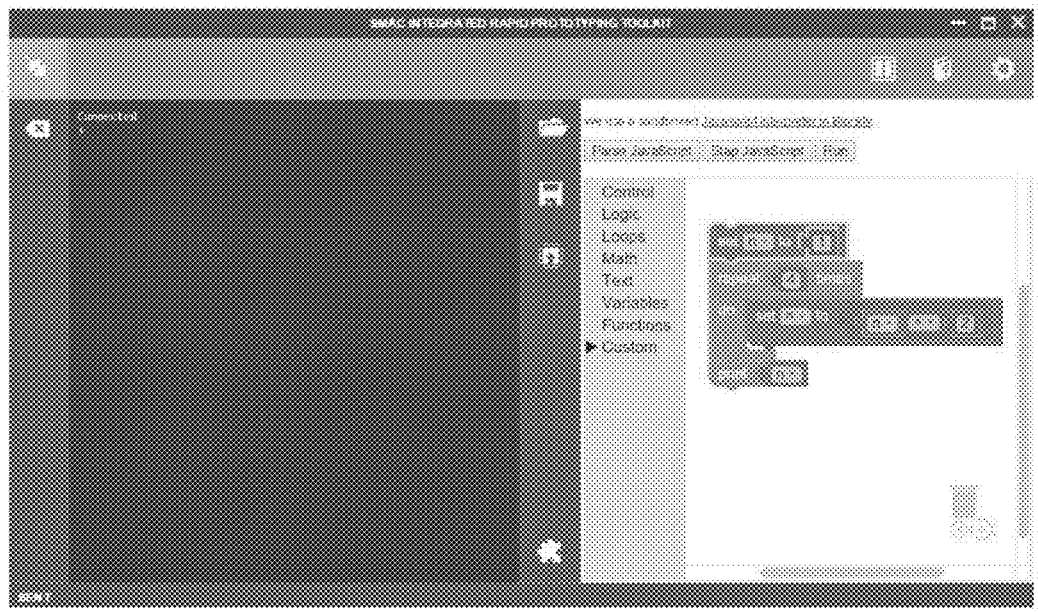
FIG. 2
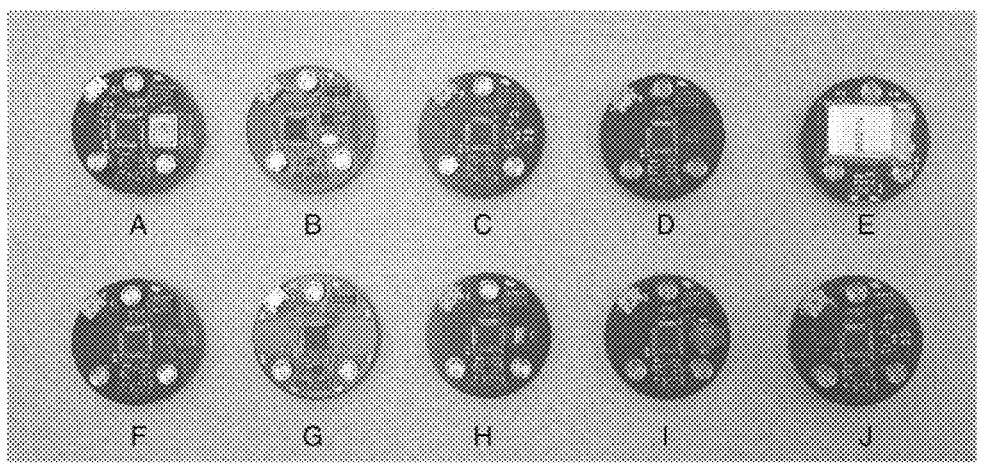
FIGS. 3A-J

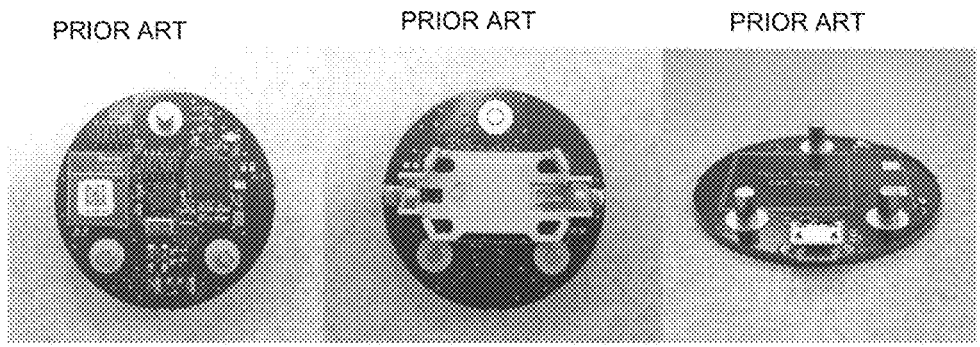
FIG. 6A (PRIOR ART)  FIG. 6B (PRIOR ART)  FIG. 6C (PRIOR ART)
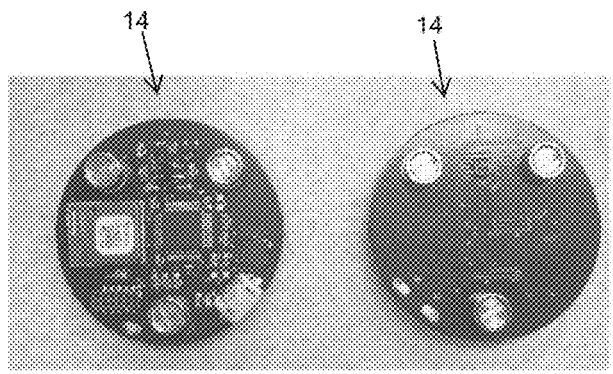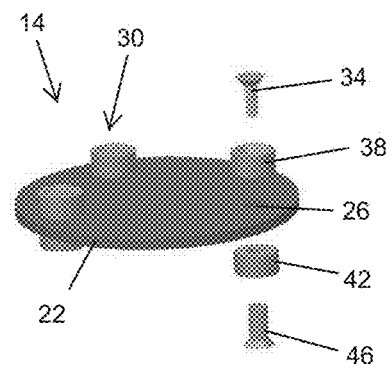
FIG. 7A  FIG. 7B  FIG. 7C

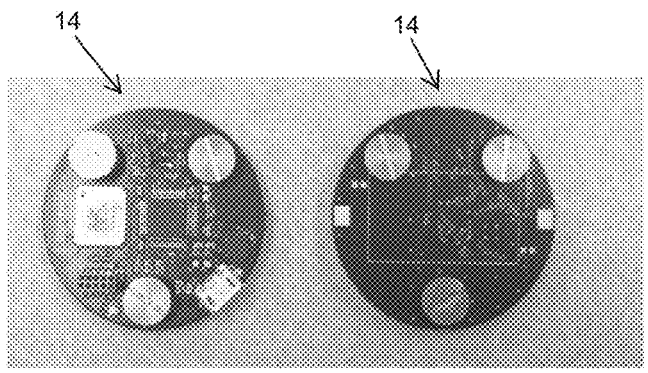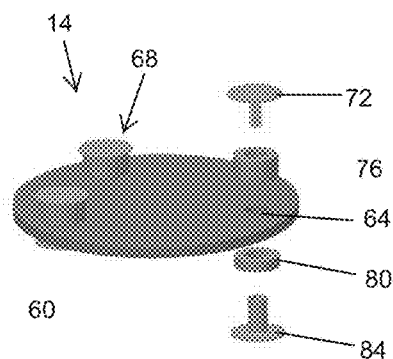
FIG. 8A    FIG. 8B    FIG. 8C
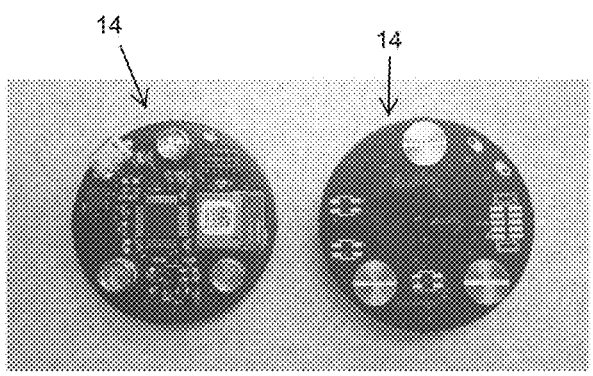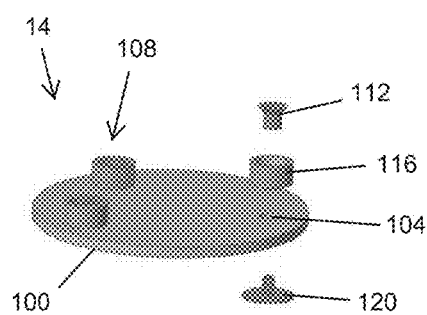
FIG. 9A    FIG. 9B    FIG. 9C

MULTI-PLATFORM MODULAR DEVICE

CROSS-REFERENCE TO RELATED APPLICATIONS

This application is a non-provisional of and claims the benefit of U.S. Provisional Application No. 62/353,673, filed on Jun. 23, 2016, the contents of which are incorporated herein by reference.

STATEMENT REGARDING FEDERALLY FUNDED RESEARCH

This invention was made with government support under 1453129 and 1506285 awarded by the National Science Foundation. The Government has certain rights in this invention.

BACKGROUND OF THE INVENTION

The demand for graduates in science, technology, engineering, and math (STEM) has steadily increased in the last decades. In the United States alone, jobs for biomedical engineers are expected to increase by 62 percent by 2020, while jobs in software development and medical science are expected to increase by 32 percent and 36 percent, respectively. Combine with an insufficient number of students enrolled in STEM fields, this will result in about 2.4 million STEM job vacancies by 2018.

Therefore, increasing the number of STEM graduates is currently a national priority for many governments worldwide. An effective way to engage young minds in STEM disciplines is to introduce robotic kits into primary and secondary education. The most widely used robotic kits, such as LEGO Mindstorm, the VEX Robotics, and the Fishertechnik, are composed by libraries of prefabricated parts that are not interoperable among kits from different vendors. Alternatives to these popular robotic kits are either highly modular, but very expensive (e.g., Kondo, Bioloid, Cubelets, K-Junior V2 and Kephera) and unaffordable for a majority of schools, or single-configuration and low-cost robots (e.g., AERObot, iRobot, and Boe-Bot) with a restricted number of activities possible. An afforadable solution that provides a number of interchangeable modules is littleBits. This platform offers a variety of sensing and actuation modules that use magnets to connect, but lack programmability, and thus it limits students' ability to learn about coding.

SUMMARY OF THE INVENTION

There is a need for robotic educational toolkits with multiple modules to have an easy, yet reliable, connectivity between the modules. Standard multi-pole, male-female connectors are not perceived as "cool" from the perspective of potential users, such as STEM students. Accordingly, embodiments of the invention provide a three-wire electro-mechanical connectivity based on permanent magnets for the seamless wireless connection of modular electronic building blocks for a modular robot for quick prototyping.

In one embodiment, the invention provides a multi-platform modular device. The device includes a first module configured to perform a first function and including a first set of electrical contacts selectively coupleable to a second set of electrical contacts of a second module. The modular robotic kit also includes a second module configured to perform a second function, the second function being different than the first function, and including a second set of electrical contacts selectively coupleable to the electrical contact of a third module. The first set of electrical contacts and the second set of electrical contacts includes a Chicago screw configured to be inserted through a first magnet and a first side of a printed circuit board. The first set of electrical contacts and the second set of electrical contacts also includes a Chicago nut configured to be inserted opposite the Chicago screw through a second magnet and a second side of the printed circuit board to receive the Chicago screw. When the Chicago nut receives the Chicago screw, a mechanical and electrical connection is made.

In another embodiment, the invention provides a multi-platform modular device including a first module configured to perform a first function and including a first set of electrical contacts and a second module configured to perform a second function, the second function being different than the first function, and including a second set of electrical contacts selectively coupleable to the first set of electrical contacts of the first module. The first set of electrical contacts and the second set of electrical contacts include a magnet, a Chicago screw configured to be inserted through a first side of a printed circuit board, and a Chicago nut configured to be inserted opposite the Chicago screw through a second side of the printed circuit board to receive the Chicago screw. An electro-mechanical connection between the first module and the second module is made when the Chicago nut receives the Chicago screw.

Other aspects of the invention will become apparent by consideration of the detailed description and accompanying drawings.

BRIEF DESCRIPTION OF THE DRAWINGS

FIG. 2 illustrates a screenshot from a programming environment for the multi-platform modular device of FIG. 1 according to some embodiments.

FIGS. 3A-J illustrate a plurality of modules each having a different functionality according to some embodiments.

FIGS. 6A-C illustrate modules for a multi-platform modular device having a snap-on three-wire magnetic connection based on press-fit magnets.

FIGS. 7A-B illustrate a top view and a bottom view, respectively, of a module for a multi-platform modular device having a three-wire electro-mechanical connectivity based on permanent magnets according to some embodiments.

FIG. 7C illustrates an exploded view of the module of FIGS. 7A-B having a three-wire electro-mechanical connectivity based on permanent magnets according to some embodiments.

FIGS. 8A-B illustrate a top view and a bottom view, respectively, of a module for a multi-platform modular device having a three-wire electro-mechanical connectivity based on permanent magnets according to some embodiments.

FIG. 8C illustrates an exploded view of the module of FIGS. 8A-B having a three-wire electro-mechanical connectivity based on permanent magnets according to some embodiments.

FIGS. 9A-B illustrate a top view and a bottom view, respectively, of a module for a multi-platform modular device having a three-wire electro-mechanical connectivity based on permanent magnets according to some embodiments.

FIG. 9C illustrates an exploded view of the module of FIGS. 9A-B having a three-wire electro-mechanical connectivity based on permanent magnets according to some embodiments.

DETAILED DESCRIPTION

Figure 1:
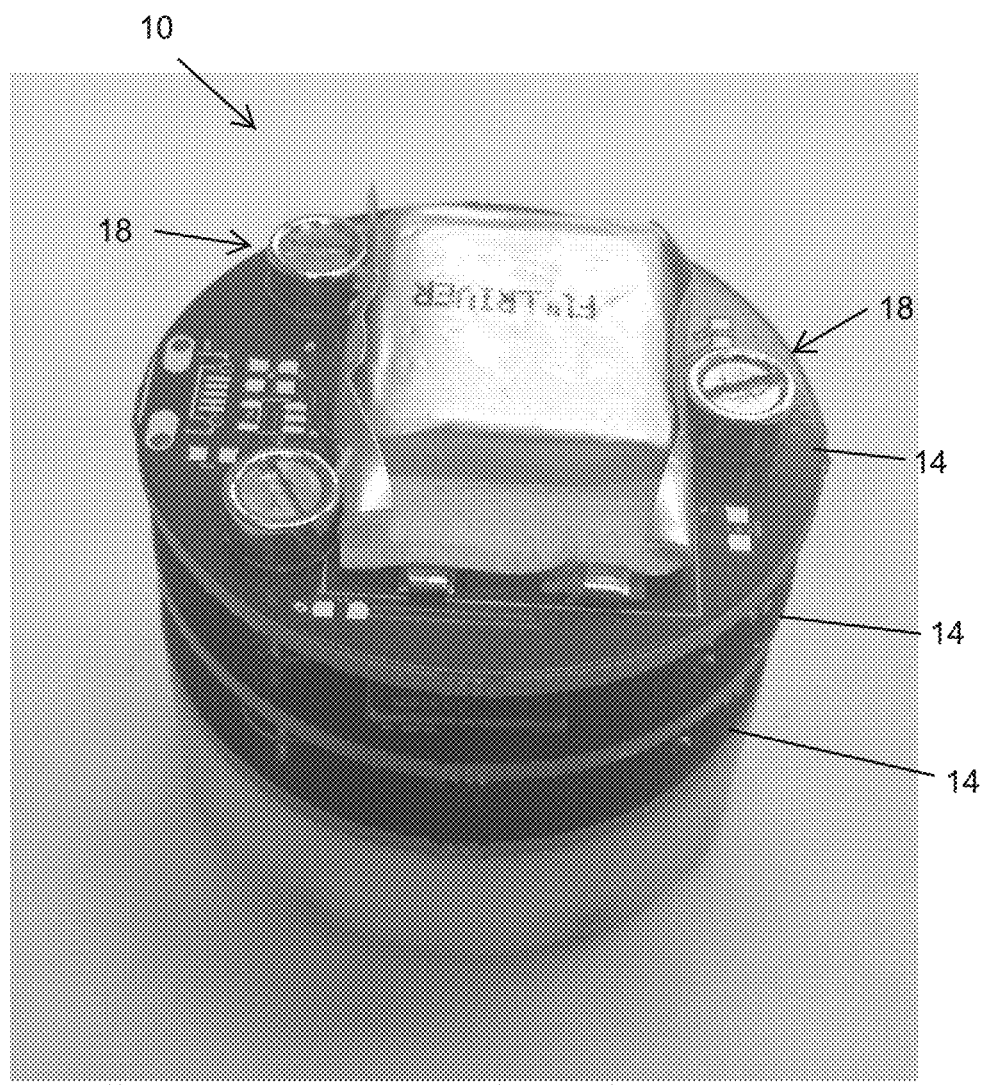
FIG. 1 illustrates a multi-platform modular device embodied as a modular robot according to an embodiment of the present invention.

It is to be understood that both the foregoing general description and the following detailed description are exemplary and explanatory and are intended to provide further explanation of the subject technology as claimed. The invention is not limited in its application to the details of construction and the arrangement of components set forth in the following description or illustrated in the drawings. The invention is capable of other embodiments and of being practiced or of being carried out in various ways. Additional features and advantages of the subject technology will be set forth in the description below, and in part will be apparent from the description, or may be learned by practice of the subject technology.

A plurality of hardware and software based devices, as well as a plurality of different structural components may be utilized to implement the invention. In addition, embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (e.g., stored on non-transitory computer-readable medium) executable by one or more processors. As such, it should be noted that a plurality of hardware and software based devices, as well as a plurality of different structural components, may be utilized to implement the invention. For example, "mobile device," "computing device," and "server" that may be described in the specification may include one or more electronic processors, one or more memory modules including non-transitory computer-readable medium, one or more input/output interfaces, and various connections (e.g., a system bus) connecting the components.

FIG. 1 illustrates a multi-platform modular device 10. As illustrated, the multi-platform modular device 10 is embodied as a modular robot. The multi-platform modular device 10 can have, for example, a 40 mm diameter cylindrical footprint comprising a plurality of platforms or modules 14. Each module 14 implements a different function and, as described in more detail below, can be connected to another module via a plurality of magnetic contacts. As illustrated in FIG. 1, there are three magnetic contacts used for synchronization, communication, and power delivery. More or fewer magnetic contacts may be employed to perform more or fewer functions. A programmable microcontroller can be integrated in each module 14 to implement, for example, a communication protocol and user commands specifically relating to the module's function. As described in more detail below, the user of the multi-platform modular device 10 (e.g., a STEM student) can select the appropriate functional modules that provide the specific functions for completing the end task.

In some embodiments, the multi-platform modular device 10 can be utilized to build robots that can be programmed through a web-based user interface installed either as a plugin or an application (e.g., an application on the Google Chrome browser). The software architecture of the modular robots can be based on JavaScript Object Notation (JSON) (http://developers.google.com/blockly/). JSON is human readable, multi-lingual, and computer platform independent. The modular robots can be controlled by commands in the form of JSON strings sent from controlling devices, such as a personal computer (PC), a smart communication device, a tablet, and the like. The string notation can be roughly divided into two parts: (1) a key; and (2) the properties of the key. A key can be any configurable part of the modular robot, such as a light emitting diode (LED) indicator or a servomotor. The key can be configured with one or multiple properties. For example, an LED's on/off property can be denoted in 1 (on) or 0 (off). For example, the JSON to light up LED1 may read: {"led1":1}. Accordingly, JSON is a simple way to group data together in a straightforward manner, thus making it easy for programmers to read and understand.

JSON strings can be exchanged between devices via a serial port, Bluetooth, Wi-Fi, and the like. Each robotic module can have a JSON interpreter. The JSON interpreter is an embedded tool that parses received JSON strings. When a JSON string is received, the JSON interpreter processes the received JSON string and informs the robotic module what to do next. This approach enhances the interoperability of the modular robot as it enables a clean-cut, two-way communication between the controlling device and each robotic module, regardless of what kind of communication channel is chosen.

Additionally, JSON is completely language-independent. A variety of programming languages can be used to parse and generate JSON strings, like, for example, C. Similarly, JSON is supported by most major operating systems and platforms, including, for example, Windows, iOS, Linux, and Chrome OS. This saves the drudgery of converting languages between different systems and platforms.

In some embodiments, a Google Chrome application ("the Application") can be created based on the open-source Espruino environment (https://github.com/espruino/Esprunio) to manipulate JSON strings. The Application can include a terminal window, a code editor, and Google Blockly (https://developers.google.com/blockly) with a JavaScript interpreter. The terminal window allows a user to type a command in JSON and send it to the robotic module connected to the controlling device. The process can be reversed for the robotic module to send feedback to the controlling device. The code editor has a similar functionality as the terminal window except the code editor allows users to modify the code for sending the code to the robotic module. To make the programming process more engaging for STEM students, Google Blockly can be incorporated into the Application. Google Blockly is a visual programming tool. Google Blockly breaks down all programming elements into different blocks. A unit of block may represent, for example, a function or a loop. When a user steps through a program built by blocks, a corresponding block can be highlighted to indicate which step is currently in process. In this way, the user can easily see how a program flows and understand the logic behind it. Meanwhile, in the background, Google Blockly's JavaScript interpreter converts the blocks into actual code, which will then be processed and executed by the computer. The visual and interactive features of Google Blockly make it an ideal tool to teach STEM students about basic programming. The Application can be made available for download and can be compatible with different operating systems, as long as a Chrome or a Chromium browser can be installed. FIG. 2 illustrates a screenshot of the Application programming environment with Google Blockly parsing code and stepping through the program.

The JSON parser used for interpreting commands and responses can also be used to parse synchronization signals. A synchronization signal is sent periodically over a local/wired connection by a master robotic module to let all of the connected robotic modules know about the local/wired network that the robotic modules are joining to. This synchronization signal contains information about wireless channel/frequency, wireless Advanced Encryption Standard (AES) encryption key for secure communication over wireless connection, and synchronization period. Any robotic module connected to the master robotic module has to listen to the synchronization signal and set all wireless radio transceiver parameters accordingly.

Once the JSON communication and data synchronization are set up, a Bluetooth mobile application can be used to control the functionalities of the modular robot. Bluetooth has many advantages for the module robotic platform. Bluetooth is low-energy and offers a reliable and private connection over large distances. Since most smartphones and tablets today are equipped with Bluetooth compatibility, this provides great flexibility for devices that can be used to control the robotic modules.

Anaren Atmosphere Developer (https://atmosphere.anaren.com/) can be used to create and design a mobile application that connects with a Bluetooth Low Energy (BLE) module on the modular robot. This online development environment provides a user friendly platform to quickly create smartphone applications where the application and firmware for the chip are developed simultaneously. The Anaren Atmosphere Developer provides a combination of a graphical user interface along with C and JavaScript coding that is easy to use, while still maintaining a wide range of functionalities. Another benefit of the Anaren Atmosphere Developer is the compatibility with many different platforms. Since the development environment is online, this allows access to the same documents from any PC with a web browser running any operating system. The Atmosphere application can be downloaded on both Apple and Android smartphones and tablets, and the Anaren Atmosphere Developer offers support for creating graphical layouts to fit the screen sizes for any device. These benefits make it easy to create new applications to expand the capabilities of the modular robots even further.

When a robot is powered up and all modules are synchronized, the Bluetooth application built with Anaren Atmosphere Developer can send signals containing commands and data to the BLE module. The BLE module can send signals to the other robotic modules through a communication point (e.g., telling the other robotic modules to synchronize to the same communication channel). Afterwards, all of the robotic modules will be on the same communication channel and able to communicate wirelessly. Then, each robotic module that receives a command will parse the command with an embedded JSON parser. In this manner, all of the robotic modules can receive and process the same information sent by the Bluetooth application.

In summary, the robotic modules synchronize to the same wireless communication channel first. Then a master module (in this case, the BLE module) receives data in the form of a JSON string through a serial port (e.g., Bluetooth or 802.15.4 wireless). The other robotic modules can then communicate and exchange data from one to another (also in the form of JSON strings) through wireless communication. The JSON strings can be used as commands, for getting feedback of sensor status, and for sensor data collection over a wired or a wireless connection.

In terms of functionality, the modules 14 can be individually classified as an input module, an output module, a mobility module, a communication module, a power module, and the like, as illustrated in FIGS. 3A-J. An output module can include an analog or digital output with indicators (e.g., light or sound indicators). For example, FIG. 3C illustrates an output module that can be used to drive motors, relays, or buzzers to generate sound. FIG. 3G illustrates an output module with several LED lights. FIG. 3I illustrates an output module with a built-in buzzer to generate sound. A communication module can include an analog or digital interface for communicating among blocks (e.g., via Bluetooth, Wi-Fi, and the like). For example, FIG. 3A illustrates a communication module implementing Bluetooth Low Energy (BLE). FIG. 3B illustrates a communication module implementing a 2.4 GHz FSK radio chip. A power module can include an analog interface with a source of power (e.g., a rechargeable battery, coin battery, and the like). For Example, FIG. 3E illustrates a power module with a lithium ion polymer battery and an on-board charger. An input module can include an analog or digital input with sensing capabilities (e.g., temperature, humidity, pressure, pushbutton, and the like). For example, FIG. 3D illustrates an input module with an inertial measurement unit (IMU). FIG. 3F illustrates an input module with a humidity/pressure sensor. FIG. 3H illustrates an input module with a barometer. A mobility module can include an analog or digital output with rotational or translational motion actuators (e.g., direct current brushed electric motor, direct current brushless electric motor, servomotor, muscle wire, and the like). For example, FIG. 3J illustrates a mobility module with a couple of independent brushed motors connected to rubber wheels.

The diameter of each module 14 can, for example, be about 40 mm, as illustrated in FIGS. 3A-J, while the thickness can range from about 6.4 mm to about 19.2 mm. In some embodiments, the size of each module is dependent on the functionality of the module. For example, for certain activities, size may become a dominant requirement over modularity. The modules 14 illustrated in FIGS. 3A-J are provided as examples of a module for a modular robot, and the embodiments described herein may be used with any type of module and is not limited to the example modules illustrated in FIGS. 3A-J. As illustrated in the figures, the modules are circular-shaped. In other embodiments, the modules may be square-shaped, triangular-shaped, or other suitable shapes. In addition, the modules are not required to all be the same shape.

As discussed above, when a module 14 is powered on, either by snapping on a battery module or snapping it onto a group of modules, it starts listening for synchronization signals. These signals contain the channel the modules are currently using an AES encryption key for secure communication and joining the network, and synchronization period. A synchronization signal is sent periodically via the data communication point by a master module. In case a signal is not detected after a certain period of time, the module is allowed to promote itself as master, assign its own channel, and start sending its own synchronization signal. If a synchronization signal is detected, then the newly connected module will try to join the network.

Figure 4:
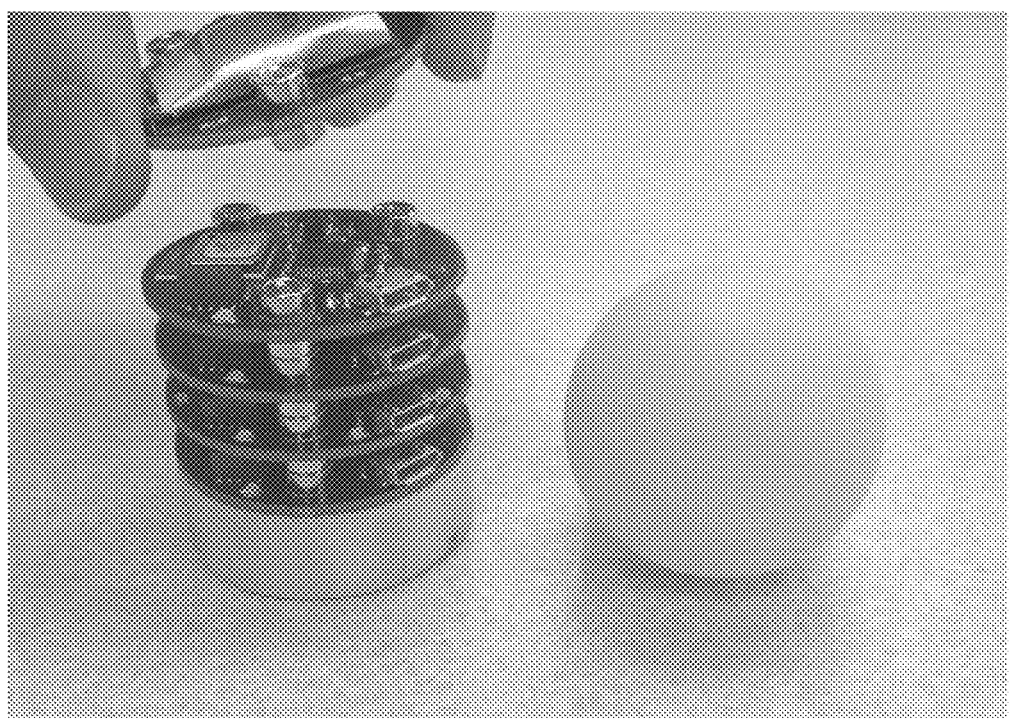
FIG. 4 illustrates three magnetic contacts for connecting the plurality of modules of FIGS. 3A-J according to some embodiments.

As illustrated in FIG. 4, each module 14 can be designed and built on a fully assembled printed circuit board (PCB) having three embedded magnetic contacts 18. The magnetic contacts 18 provide for electronic and data interconnection between the circuits (e.g., the PCB) in each module 14. This magnetic interconnection provides for robust energy delivery and a one-wire communication interface throughout the modular robot.

Figure 5:
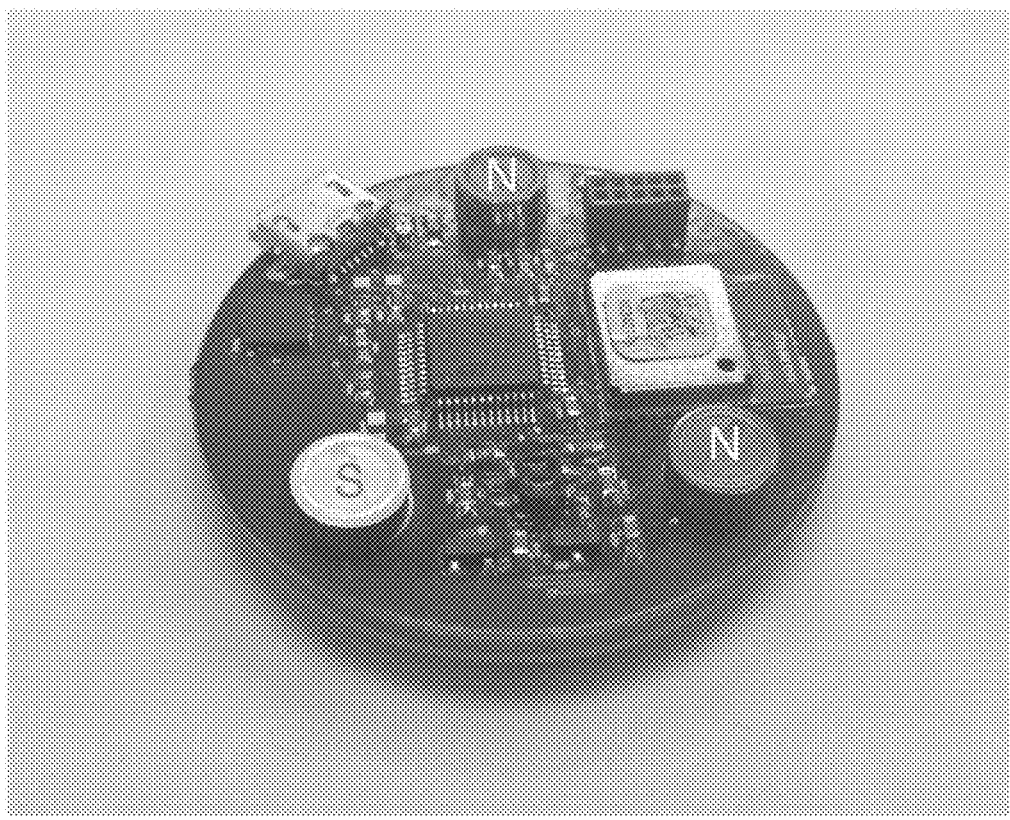
FIG. 5 illustrates the polarities of the three magnetic contacts illustrated in FIG. 4, allowing only one possible connection configuration of the modules according to some embodiments.

In some embodiments, the embedded magnetic contacts 18 are positioned on the circular PCB at an angle of 90° (N-S polarity for data communication point), 225° (S-N polarity for the first powering point), and 315° (N-S polarities for the second powering point), as illustrated in FIG. 5. With such a polarity placement, modules 14 can only be connected when the next module 14 is properly oriented (e.g., the module being connected is facing up). The polarities for powering points can include a resettable fuse and reverse polarity protection. Accordingly, users do not need to worry about placing the battery in the wrong way because issues arising from reverse polarity can be taken care of by a bridge rectifier built into the power module.

Traditionally, robotic modules are connected via a snap-on three-wire magnetic connection based on press-fit magnets, as illustrated in FIGS. 6A-C. However, the standard multi-pole, male-female connector configuration is not perceived as "cool" to potential users (e.g., STEM students and other customers). Furthermore, a three-wire contact based on press-fit magnets has limitations. First, the cost of fabrication is increased because fabrication for such a configuration cannot be automated. Instead, a fabrication operator must press-fit the magnets into each PCB (e.g., into a groove or set of grooves in the PCB). Additionally, each magnet can become disconnected from the groove at any time, which compromises the functionality of the module.

Accordingly, embodiments of the invention provide for an easy and reliable connectivity between the modules 14 that maintains the intuitiveness and simplicity of a three-wire magnetic connection while also enabling mass-fabrication. Specifically, as illustrated in FIGS. 7A-C, 8A-C, and 9A-C, embodiments of the invention provide a three-wire electromechanical connectivity based on permanent magnets using a combination of Chicago screws and doughnut-shaped magnets.

With the disclosed three-wire electro-mechanical connectivity, each of the modules 14 can exchange power and communication with adjacent modules 14 via a three-wire bus. The three-wire bus can be physically connected to three-points of contact on the PCB. As mentioned above, the PCB of the modules 14 can have a groove or set of grooves. In some embodiments, at the three-points of contact, the PCB has a groove or set of grooves for press fitting cylindrical permanent magnets into. As mentioned above, appropriate arrangement of magnet polarities ensure that the user connects the modules in the proper configuration. Therefore, the possibility of incorrect connections is eliminated. In other words, due to the arrangement of the south-north polarity of each of the three magnets, magnetic coupling is achieved only when the modules are correctly aligned.

FIGS. 7A-C illustrate one embodiment of a multi-platform modular device with three-wire magnetic connectivity based on permanent magnets. As illustrated in FIGS. 7A-C, the PCB 22 includes a plurality of holes 26 for receiving each contact point 30. The contact point 30 can include a countersink head Chicago screw 34, a first countersink doughnut-shaped magnet 38, a second countersink doughnut-shaped magnet 42, and a countersink head Chicago nut 46. As illustrated in the exploded view of FIG. 7C, the countersink head Chicago nut 46 is inserted through the second countersink doughnut-shaped magnet 42 and received by the bottom side of the PCB 22. The countersink head Chicago screw 34 is inserted through the first countersink doughnut-shaped magnet 38 and received by the countersink head Chicago nut 46. When the countersink head Chicago nut 46 receives the countersink head Chicago screw 34, the countersink head Chicago screw 34 is connected to the countersink head Chicago nut 46 (e.g., via rotating the countersink head Chicago screw into the countersink head Chicago nut) to form a contact point 30 that protrudes from both sides of the PCB 22. In the embodiment illustrated in FIGS. 7A-C, at least the surface of the magnet (e.g., the first countersink doughnut-shaped magnet 38 and/or the second countersink doughnut-shaped magnet 42) must be conductive such that the electrical connectivity is guaranteed by the magnet. In some embodiments, the countersink head Chicago screw 34 and the countersink Chicago nut 46 are also conductive to improve the electrical connectivity.

Accordingly, the embodiment illustrated in FIGS. 7A-C establishes a reliable mechanical connection via the countersink head Chicago screw 34 and the countersink head Chicago nut 46. Furthermore, the embodiment illustrated in FIGS. 7A-C establishes an easy electrical connection via the conductive magnets (e.g., the first countersink doughnut-shaped magnet and the second countersink doughnut-shaped magnet). For example, when a user wants to connect a first module to a second module, the first countersink doughnut-shaped magnets of the first module and the second countersink doughnut-shaped magnets of the second module will form an electrical connection which allows for the communication of data and/or power between the first module and the second module.

FIGS. 8A-C illustrate another embodiment of a three-wire magnetic connectivity based on permanent magnets. As illustrated in FIGS. 8A-C, the PCB 60 includes a plurality of holes 64 for receiving each contact point 68. The contact point 68 can include a flat head Chicago screw 72, a first doughnut-shaped magnet 76, a second doughnut-shaped magnet 80, and a flat head Chicago nut 84. As illustrated in the exploded view of FIG. 8C, the flat head Chicago nut 84 is inserted through the second doughnut-shaped magnet 80 and received by the bottom side of the PCB 60. The flat head Chicago screw 72 is inserted through the first doughnut-shaped magnet 76 and received by the flat head Chicago nut 84. When the flat head Chicago nut 84 receives the flat head Chicago screw 72, the flat head Chicago screw 72 is connected to the flat head Chicago nut 84 (e.g., via rotating the flat head Chicago screw into the flat head Chicago nut) to form a contact point 68 that protrudes from both sides of the PCB 60. In the embodiment illustrated in FIGS. 8A-C, at least the surface of the magnet (e.g., the first doughnut-shaped magnet and/or the second doughnut-shaped magnet) must be conductive such that the electrical connectivity is guaranteed by the magnet. In some embodiments, the flat head Chicago screw 72 and the flat head Chicago nut 84 are also conductive to improve the electrical connectivity. In the embodiment illustrated in FIGS. 8A-C, the head of the flat head Chicago screw 72 completely covers the first doughnut-shaped magnet 76 and the head of the flat head Chicago nut 84 completely covers the second doughnut-shaped magnet 80. In this instance, the flat head Chicago screw 72 is conductive. Accordingly, the electrical connectivity occurs through the flat head Chicago screw/nut.

Accordingly, the embodiment illustrated in FIGS. 8A-C establishes a reliable mechanical connection via the flat head Chicago screw 72 and the flat head Chicago nut 84. Furthermore, the embodiment illustrated in FIGS. 8A-C establishes an easy electrical connection via the conductive flat head Chicago screw 72 and the flat head Chicago nut 84. For example, when a user wants to connect a first module 14 to a second module 14, the first Chicago screw/nut of the first module and the second Chicago screw/nut of the second module will form an electrical connection which allows for the communication of data and/or power between the first module and the second module.

FIGS. 9A-C illustrate another embodiment of a three-wire magnetic connectivity based on permanent magnets. As illustrated in FIGS. 9A-C, the PCB 100 includes a plurality of holes 104 for receiving each contact point 108. The contact point 108 can include a countersink head Chicago nut 112, a countersink doughnut-shaped magnet 116, and a flat head Chicago screw 120. As illustrated in the exploded view of FIG. 9C, the flat head Chicago screw 120 is inserted through the bottom side of the PCB 100. The countersink head Chicago nut 112 is inserted through the countersink doughnut-shaped magnet 116 and received by the flat head Chicago screw 120. When the countersink head Chicago nut 112 receives the flat head Chicago screw 120, the flat head Chicago screw 120 is connected to the countersink head Chicago nut 112 (e.g., via rotating the flat head Chicago screw into the countersink head Chicago nut) to form a contact point 108 that protrudes from one side of the PCB 100. In the embodiment illustrated in FIGS. 9A-C, the head of the flat head Chicago screw 120 completely covers the countersink doughnut-shaped magnet 116 and at least the surface of the magnet (e.g., the countersink doughnut-shaped magnet) must be conductive such that the electrical connectivity is guaranteed by the magnet. In some embodiments, the countersink head Chicago nut 112 and the flat head Chicago screw 120 are also conductive to improve the electrical connectivity.

Accordingly, the embodiment illustrated in FIGS. 9A-C establishes a reliable mechanical connection via the flat head Chicago screw 120 and the countersink head Chicago nut 112. Furthermore, the embodiment illustrated in FIGS. 9A-C establishes an easy electrical connection via the conductive flat head Chicago screw 120 and countersink head Chicago nut 112. For example, when a user wants to connect a first module 14 to a second module 14, the flat head Chicago screw of the first module and the countersink doughnut-shaped magnet of the second module will form an electrical connection which allows for the communication of data and/or power between the first module and the second module.

With the support of versatile software architecture and flexible hardware configurations, the modular robot can be implemented in a variety of hands-on applications fitting different STEM curricula, such as a robot soccer game, maze exploration, and the like. Such educational activities can be integrated in core subjects of STEM curricula, such as physics, computer science, engineering, math, and the like. The multi-platform modular device 10 illustrated in FIG. 1 is assembled to show one example of a device embodied as a modular robot, and the embodiments described herein may be used with any suitable type of robot and is not limited to the example modular robot illustrated in FIG. 1.

Figure 10A:
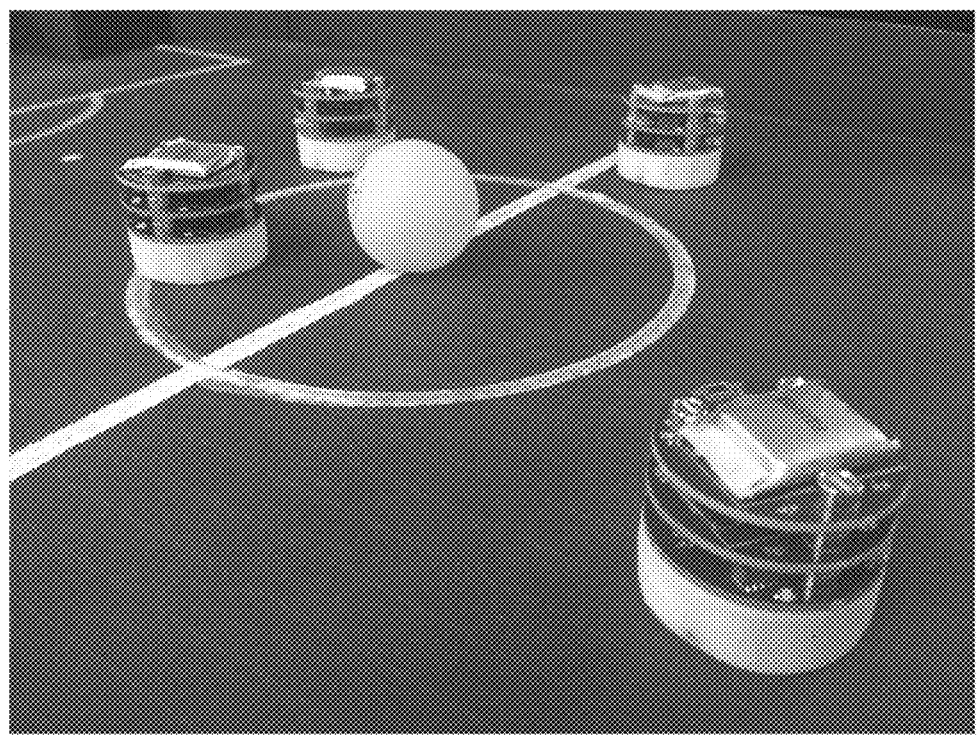
FIG. 10A illustrates a 2-on-2 modular robot soccer game with a table tennis ball.
Figure 10B:
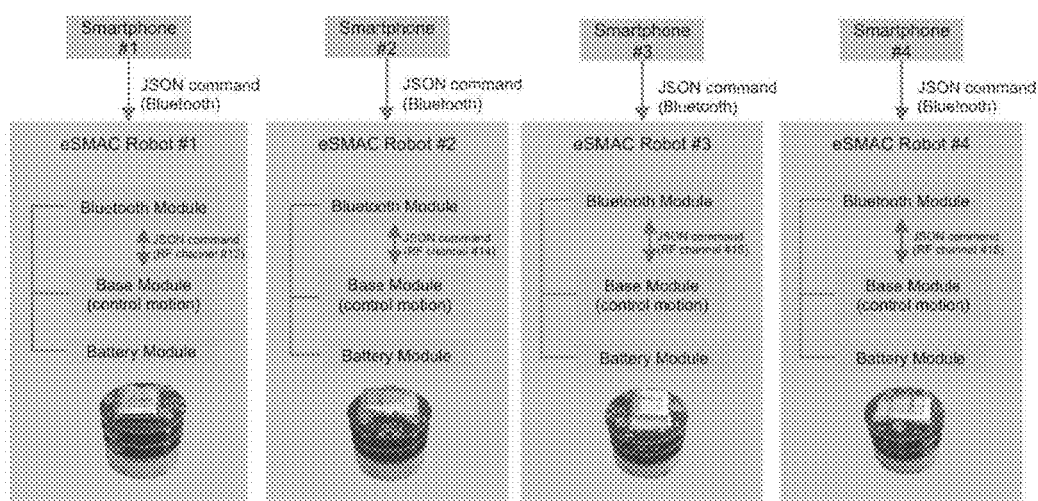
FIG. 10 B illustrates block diagrams for the four modular robots used in the 2-on-2 modular robot soccer game of FIG. 10A according to some embodiments.

One application of the multi-platform modular device 10 is robot soccer. For example, FIG. 10A illustrates a 2-on-2 robot soccer game. Multiple users can each control their own modular robot with a smartphone application to play soccer with a table tennis ball in a miniature game field. As represented in FIG. 10B, each of the modular robots is composed of three modules 14 implementing mobility, communication, and power functionalities. A smartphone application has been developed with Anaren Atmosphere Developer for the BLE module to send JSON commands to the modular robots over Bluetooth. The smartphone can also receive feedback from the modular robot when the JSON commands are processed. The Bluetooth connection is ideal for a soccer game because the Bluetooth connection provides an exclusive point-to-point connection from the smartphone to the modular robot allowing several users to control their own modular robot and play on teams. Playing the robot soccer game is an effective introduction to the modular robots for STEM students, as no prior knowledge of robotics is required. While some may question the educational merit of playing robotic soccer in a classroom, the amount of learning that can take place is definitely significant. Take for instance in a computer science classroom, object oriented programming could easily be taught by creating a robot "class" that is responsible for controlling each robot. Then a computer science teacher could easily hand over that class to students and inform them that a "forward" in the game is indeed a soccer player, but would behave differently from a "goalkeeper," who is also of the same "class" soccer player. Therefore, students might be able to derive a subclass that is inherited from the original class of "soccer player." Students could then instantiate their own players based on the classes and subclasses created. This one example would provide an opportunity for a computer science teacher to model, in a tangible manner, an abstract concept such as class creation in object oriented programming. The cost of materials to make the mini soccer field (e.g., two 20×30 inch foam boards, a box cutter, glue, and a table tennis ball) is around $10, while the cost of a single modular soccer player robot is about $70 (robot base, BLE module, rechargeable battery module, and battery charger).

Figure 11A:
FIG. 11A illustrates a modular robot in a maze explorer application.
Figure 11B:
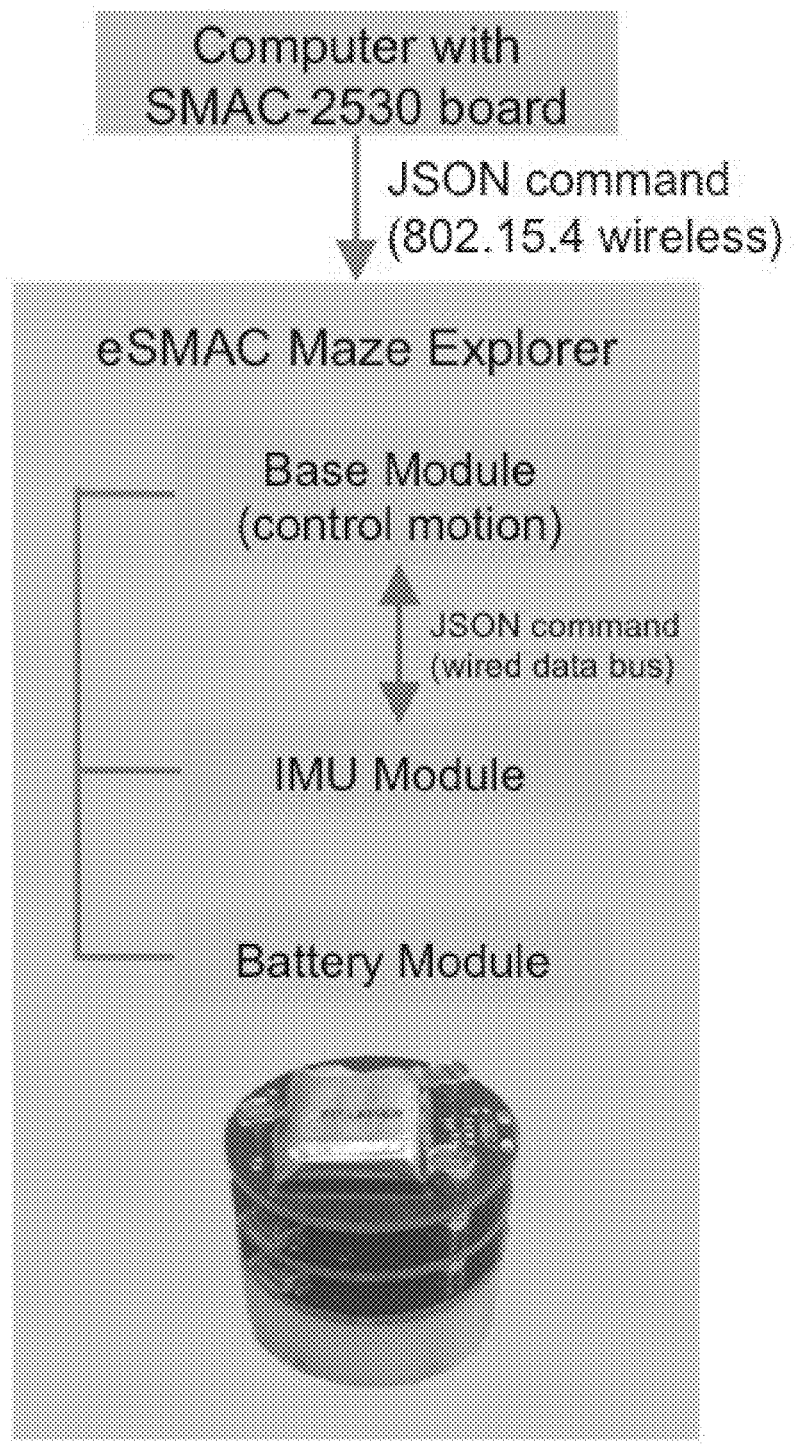
FIG. 11B illustrates a block diagram for the modular robot used in the maze explorer application of FIG. 11A according to some embodiments.

Another application, as illustrated in FIG. 11A, of the multi-platform modular device 10 is in a maze unit plan that aligns with middle grade level physical science standards or secondary grade level engineering design standards. Students begin by learning about and completing mazes while reflecting on the processes they follow to run through the maze. As an introduction to robotic programming and control, the students then begin navigating the modular robot through a maze of their own design. The students must then navigate the modular robot through the maze again using a preprogrammed series of steps that the students calculate using basic constant velocity equations and measurements of the maze. Repeated iterations of this task instill an understanding of the challenges and limitations in programming robots. The final lesson of the unit requires the students to construct their own hypothetical robot design for navigating the maze, which they will present and defend to other classmates. In this case, as illustrated in FIG. 11B, the robot takes advantage of an input module (e.g., IMU or range sensing) to detect contacts with the maze walls, a mobility module, and a power module. The cost of materials to make the reconfigurable maze (e.g., two 20×30 inch form boards and a box cutter) is around $10, while the cost of one modular maze explorer robot is about $50 (robot base, IMU module, rechargeable battery module, and battery charger).

Figure 12A:
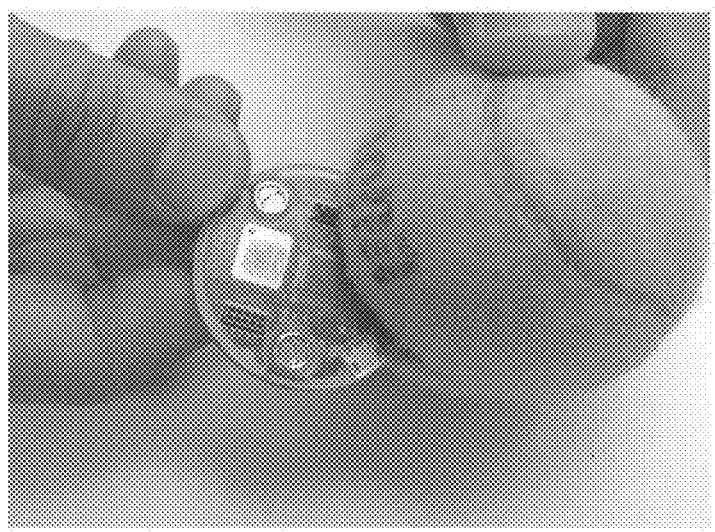
FIG. 12A illustrates a multifunctional module embedded in a tennis ball.
Figure 12B:
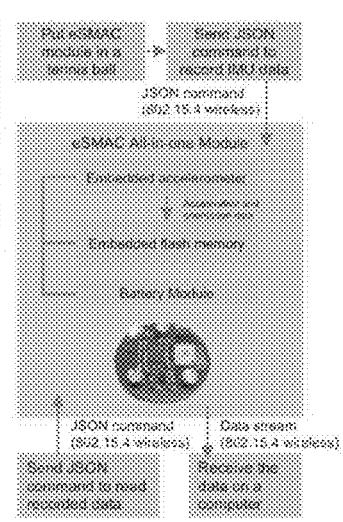
FIG. 12B illustrates a block diagram for the multifunctional module of FIG. 12A according to some embodiments.

A multifunctional module, illustrated in FIGS. 12A-B, includes a barometer, an IMU, BLE connectivity, and a coin cell rechargeable battery, and can be inserted into a tennis ball or tied onto a water bottle rocket to measure acceleration, orientation, and altitude. Data can be transferred from the module to the student's PC once the experiment is over.

As illustrated in FIGS. 12A-B, with the ability to embed the multifunctional module in a tennis ball, mathematics and science teachers can collect actual data of an object in flight and use that data as a model for investigating trajectories of objects. In terms of learning outcomes, this application will help students get hands on experience with physics concepts, such as acceleration, velocity, and atmospheric pressure. With this affordable tool at the hands of teachers and students, investigations can reveal many of the standards that teachers set out to share. When students develop their own conclusions, learning becomes much richer and long lasting. The requirements set by the Next Generation Science Standards (NGSS) can be easily met using this modular equipment in a classroom.

Thus, the invention provides, among other things, a modular robotic toolkit having a three-wire electro-mechanical connectivity based on magnetic coupling. Various features and advantages of the invention are set forth in the following claims.

What is claimed is:

1. A multi-platform modular device comprising:
   a first module configured to perform a first function and including a first set of electrical contacts; and
   a second module configured to perform a second function, the second function being different than the first function, and including a second set of electrical contacts selectively coupleable to the first set of electrical contacts of the first module,
   wherein the first set of electrical contacts and the second set of electrical contacts include
      a Chicago screw configured to be inserted through a first magnet and a printed circuit board, and
      a Chicago nut configured to be inserted opposite the Chicago screw through a second magnet and the printed circuit board to receive the Chicago screw,
   wherein, a first electro-mechanical connection is made when the Chicago nut receives the Chicago screw.

2. The multi-platform modular device of claim 1, wherein the first magnet and the second magnet are countersink doughnut-shaped magnets.

3. The multi-platform modular device of claim 1, wherein, when the Chicago nut receives the Chicago screw, the Chicago screw covers a top surface of the first magnet and the Chicago nut covers a top surface of the second magnet.

4. The multi-platform modular device of claim 1, wherein the Chicago screw and the Chicago nut are conductive.

5. The multi-platform modular device of claim 1, wherein the first magnet and the second magnet are conductive.

6. The multi-platform modular device of claim 1, wherein a second electro-mechanical connection is formed between the first module and the second module when the first set of electrical contacts is magnetically coupled to the second set of electrical contacts.

7. The multi-platform modular device of claim 6, wherein the second electro-mechanical connection includes an electrical connection that is formed between a first magnet of the first module and a second magnet of the second module.

8. The multi-platform modular device of claim 6, wherein the second electro-mechanical connection includes an electrical connection that is formed between a first magnet of the first module and a first magnet of the second module.

9. The multi-platform modular device of claim 6, wherein the second electro-mechanical connection includes an electrical connection that is formed between a Chicago screw of the first module and a Chicago nut of the second module.

10. The multi-platform modular device of claim 6, wherein the second electro-mechanical connection includes an electrical connection that is formed between a Chicago screw of the first module and a Chicago screw of the second module.

11. The multi-platform modular device of claim 1, wherein the first set of electrical contacts includes three Chicago screws, three Chicago nuts, three first magnets, and three second magnets.

12. The multi-platform modular device of claim 11, wherein the second set of electrical contacts includes three Chicago screws, three Chicago nuts, three first magnets, and three second magnets.

13. A multi-platform modular device including comprising:
   a first module configured to perform a first function and including a first set of electrical contacts; and
   a second module configured to perform a second function, the second function being different than the first function, and including a second set of electrical contacts selectively coupleable to the first set of electrical contacts of the first module,
   wherein the first set of electrical contacts and the second set of electrical contacts include
      a magnet,
      a Chicago screw configured to be inserted through a first side of a printed circuit board, and
      a Chicago nut configured to be inserted opposite the Chicago screw through a second side of the printed circuit board to receive the Chicago screw,
   wherein an electro-mechanical connection is made when the Chicago nut receives the Chicago screw, and
   wherein the first module and the second module are in electrical communication when one of the first set of electrical contacts on the first module is in contact with one of the second set of electrical contacts on the second module.

14. The multi-platform modular device of claim 13, wherein the magnet is positioned on the second side of the printed circuit board and configured to receive the Chicago nut.

15. The multi-platform modular device of claim 13, wherein the magnet is positioned on the first side of the printed circuit board and configured to receive the Chicago screw.

* * * * *